United States Patent [19]
Takatori et al.

[11] Patent Number: 5,475,676
[45] Date of Patent: Dec. 12, 1995

[54] SWITCH FOR SELF-HEALING RING

[75] Inventors: Masahiro Takatori, Hachioji; Yukio Nakano, Zama; Yoshihiro Ashi; Hiroyuki Fujita, both of Yokohama, all of Japan

[73] Assignee: Hitachi, Ltd., Tokyo, Japan

[21] Appl. No.: 89,948

[22] Filed: Jul. 12, 1993

[30] Foreign Application Priority Data

Jul. 14, 1992 [JP] Japan ..................... 4-186584
Jul. 14, 1992 [JP] Japan ..................... 4-186585

[51] Int. Cl.$^6$ ................................. H04Q 11/04
[52] U.S. Cl. ...................... 370/16.1; 370/58.1
[58] Field of Search .............. 370/16, 16.1, 54–55, 370/58.1, 58.2, 58.3, 66, 68; 371/11.1, 11.2, 11.3, 8.1, 8.2; 379/221

[56] References Cited

U.S. PATENT DOCUMENTS

| | | | |
|---|---|---|---|
| 4,392,221 | 7/1983 | Hesketh | 370/54 |
| 4,543,652 | 9/1985 | Amada et al. | 370/58.1 |
| 5,079,761 | 1/1992 | Krumenacker et al. | 370/58.1 |

FOREIGN PATENT DOCUMENTS 4-57528  2/1992  Japan.

OTHER PUBLICATIONS

4-Fiber BLSR Overview, Apr. 1, 1992.

*Primary Examiner*—Douglas W. Olms
*Attorney, Agent, or Firm*—Kenyon & Kenyon

[57] ABSTRACT

First stage and third stage four-input four-output space division switches are arranged before and after a second stage time division switch, and two outputs of the first stage space division switch and two inputs of the third stage space division switch are connected by bypassing the time division switch. The time division switch has n control memories. A first control memory stores connection information in a normal state of each path set in the transmission line, a second control memory stores connection information of a first alternative path when failures occur in a path, and an n-th control memory (n is any integer equal or greater than 3) stores connection information of an (n-1)th alternative path, and a control memory corresponding the a failure pattern is selected from the n control memories for each path.

10 Claims, 21 Drawing Sheets

SWITCH FOR SELF-HEALING RING

BACKGROUND OF THE INVENTION

The present invention relates to a transmission apparatus used for a four-fiber self healing or correcting ring or a four-fiber bidirectional line switched ring, and more particularly to a construction of a node which provides an automatic detour to recover a traffic when a failure occurs in the node or link in a ring network.

In a prior art network which provides automatic recovery, a four-fiber BLSR (bidirectional line switched ring) described in Bellcore Technical Advisory TA-NWT-001230, Issue 2 has been known. A construction of a node used for the four-fiber BLSR includes one disclosed in the TA-NWT-001230, pages 3–17, FIGS. 3–12. In this construction, two working input lines, two protection input lines, two working output lines and two protection output lines are accommodated in a common unit. Such a common unit may be a time-division switch. In the four-fiber BLSR, such a node is connected in a ring. When a failure occurs, the traffic is detoured from the working line to the protection line by a TSI (time slot interchange). For example, if a failure occurs in only the lefthand working line, the node outputs the traffic which has been heretofore outputted to the left working line, to the left protection line by using the TSI function. The outputted traffic passes through the protection line and reaches a target point. When failures occur in both of the lefthand working line and the protection line, the node outputs the traffic which has heretofore been outputted to the left working line, to the opposite protection line. The outputted traffic goes around the ring in the reverse direction to that prior to the occurrence of the failure and reaches a target point. In this manner, the recovery from the failure is attained.

In such a prior art construction, since both the working line and the protection line should be accommodated in the time division switch, a scale of hardware is large and a cost increases.

SUMMARY OF THE INVENTION

The present invention provides a node for a four-fiber BLSR with a relatively small scale of hardware.

Four-input four-output space division switches are provided before and after an add-drop switch (a time-division switch) to form a three-stage construction of S-T-S, and two outputs of the space division switch of the first stage and two inputs of the space division switch of the third stage are connected, where the S-T-S is a switch construction having an arrangement of space division switch-time division switch-space division switch.

An operation of the present invention is explained with reference to FIG. 1, which shows a basic construction of a switch used for a node in a ring network shown in FIG. 2, which shows what is commonly called a four-fiber self-healing (self-correcting) ring or a four-fiber bidirectional line switched ring and which comprises nodes A, B and C in the present embodiment. Four lines are installed between adjacent nodes and two (transmission and reception) of them are used as working lines and the other two are used as protection lines. Clockwise lines are called CW lines and counter-clockwise lines are called CCW lines.

The switch shown in FIG. 1 is of a three-stage S-T-S construction. A first stage space division switch (SSW) 10 has four inputs and four outputs and accommodates a CW working line 1, a CW protection line 2, a CCW working line 3 and a CCW protection line 4. A second stage time division switch (TSW) 11 has three inputs and three outputs and accommodates two (15 and 16) of the outputs of the first stage space division switch 10 and an add line 13. Two (19 and 20) of the outputs of the time division switch 11 are connected to a third stage space division switch 12 and one of them serves as a drop line 14. The outputs 17 and 18 of the space division switch 10 are connected to delay inserters 23 and 24, respectively, which cause delays in signals on the highways 17 and 18. The delays created here are equal to that created in the time division switch 11. The delay inserters 23 and 24 are readily constructed by a RAM. Four lines, that is, two (19 and 20) of the outputs of the second stage time-division switch 11 and two (21 and 22) of the outputs of the delay inserters 23 and 24 are connected to the input of the third stage space division switch (SSW) 12.

FIGS. 3A–3C show processes of nodes A-C in a normal state. In the node A, a space division switch 10-1 connects a CW working line 1-1 to a highway 15-1. It also connects a CCW working line 3-1 to a highway 16-1. A time division switch 11-1 conducts relay/add/drop process. A space division switch 12-1 connects output highways 19-1 and 20-1 of the time division switch 11-1 to a CW working line 5-1 and a CCW working line 7-1, respectively. Similar processes are conducted in the nodes B and C.

An operation of the node when a failure occurs in the CW working line between the nodes A and B is explained with reference to FIG. 4. In FIG. 4, since the failure has occurred in the CW working line, it is necessary to use the CW protection line in place of the working line. Processes of the respective nodes in such a case are shown in FIGS. 5A–5C.

In the node A, since the failure has occurred in the transmission CW working line, the output highway 19-1 of the second stage time division switch 11-1 is connected to the CW protection line by the third stage space division switch 12-1. In a normal state, the output highway 19-1 of the time division switch 11-1 is connected to the CW working line 5-1. The above process means that the transmission CW line is switched from the working line to the protection line. In this case, there is no change in the process in the first stage space division switch 10-1 and the second stage time division switch 11-1.

In the node B, since the failure has occurred in the reception CW working line 1-2, the CW protection line 2-2 is connected to the input highway 15-2 of the second stage time division switch 11-2. by the first stage space division switch 10-2. In the normal state, the CW working line 1-2 is connected to the input highway 15-2 of the time division switch 11-2. The above process means that the reception CW line is switched from the working line to the protection line. In this case, there is no change in the process in the second stage time division switch 11-2 and the third stage space division switch 12-2.

There is no change in the node C.

An operation when failures have occurred in the CW working line and the CCW working line between the nodes A and B is explained with reference to FIG. 6. In FIG. 6, since the lines between the nodes A and B are broken, the node A loops back a signal which has been outputted in the CW direction through the CCW protection line and receives a signal which has been received in the CCW direction, from the CW protection line. The node B loops back the signal which has been outputted in the CCW direction, through the CW protection line and receives the signal which has been received in the CW direction, from the CCW protection line.

The node C connects the reception CCW protection line to the transmission protection line and connects the reception CCW protection line to the transmission protection line. The processes of the respective nodes in this case are shown in FIGS. 7A to 7C.

In the node A, since the failures have occurred in the transmission CW working line and protection line, the output highway 19-1 of the second stage time division switch 11-1 is connected to the CCW protection line 8-1 by the third stage space division switch 12-1. In the normal state, the output highway 19-1 of the time division switch 11-1 is connected to the CW working line 5-1. The above process means that the transmission CW working line loops back to the protection CCW line. Further, since the failures have occurred in the reception CCW working line and protection line, the CW protection line 2-1 is connected to the highway 16-1 by the first stage space division switch 10-1. In the normal state, the CCW working line 3-1 is connected to the highway 16-1. The above process means that the reception CCW working line is switched to the CW protection line. In this case, there is no change in the process in the second stage time division switch 11-1.

In the node B, since the failures have occurred in the transmission CCW working line and ptotection line, the output high way 20-2 of the second stage time division switch 11-2 is connected to the CW protection line 6-2 by the third stage space division switch. In the normal state, the output highway 20-2 of the time division switch 11-2 is connected to the CCW working line 7-2. The above process means that the transmission CCW working line is loops back to the CW protection line. Further, since the failures have occurred in the reception CW working line and protection line, the CCW protection line 4-2 is connected to the highway 15-2 by the first stage space division switch 10-2. In the normal state, the CW working line 1-2 is connected to the highway 15-2. The above precess means that the reception CW working line has been switched to the CCW protection line. In this case, there is no change in the process in the second stage time division switch.

The node C connects the reception CW protection line 2-3 to the transmission CW protection line 6-3 by using the two highways 17-3 and 18-3 which connect the first and third stage space division switches, and connects the reception CCW protection line 4-3 to the transmission CCW protection line 8-3. In this case, there is no change in the process in the second stage time division switch 11-3.

Through the above processes, the fault recovery is conducted.

DETAILED DESCRIPTION

A first embodiment of the present invention is now explained with reference to FIG. 1 which shows a basic construction of a switch used for a node in a ring network shown in FIG. 2.

Figure 1:
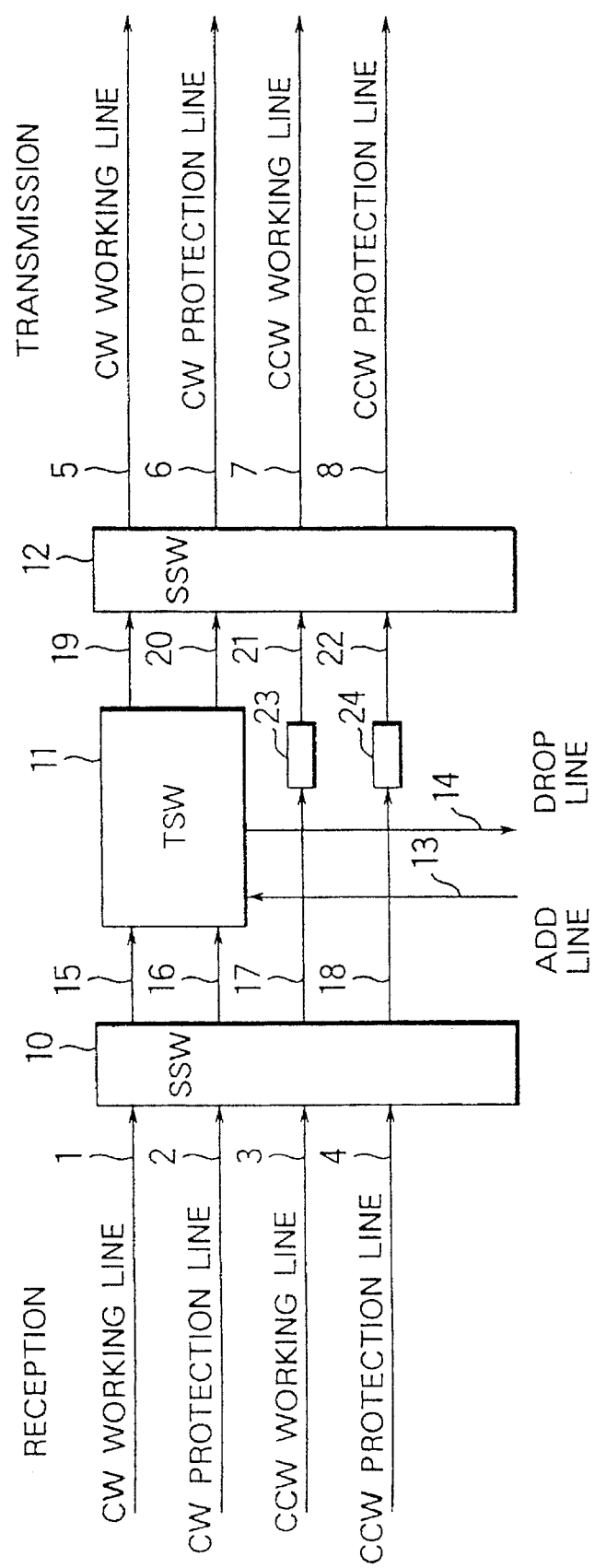
FIG. 1 shows a basic construction of a switch according to an embodiment of the present invention.
Figure 2:
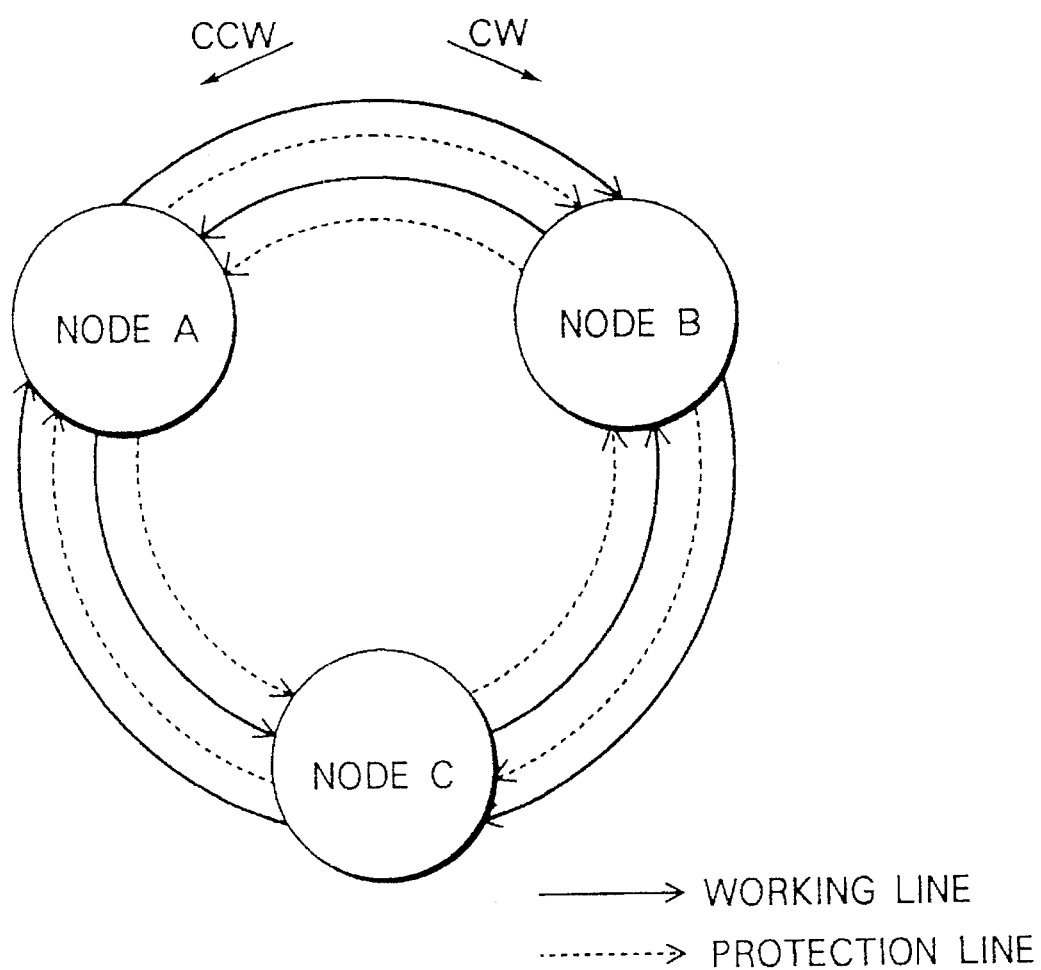
FIG. 2 shows a four-fiber self-healing ring network.

The switch in FIG. 1 is an S-T-S three-stage switch. A first stage space division switch (SSW) 10 has four inputs and four outputs and accommodates a CW working line 1, a CW protection line 2, a CCW working line 3 and a CCW protection line 4. A second stage time division switch (TSW) 11 has three inputs and three outputs and accommodates two (15 and 16) of the outputs of the first stage space division switch 10 and an add line 13. Two (19 and 20) of the outputs thereof are connected to a space division switch 12 and one serves as a drop line 14. The outputs 17 and 18 of the space division switch 10 are connected to delay inserters 23 and 24, respectively, which create delays in the signals on the highways 17 and 18. The created delays are equal to those created in the time division switch 11. The delay inserter may be readily constructed by a RAM. a third stage space switch (SSW) 12 accommodates two (19 and 20) of the outputs of the second stage time division switch 11 and two (21 and 22) of the outputs of the delay inserters 23 and 24. The time division switch 11 may be an add-drop switch.

Figure 8:
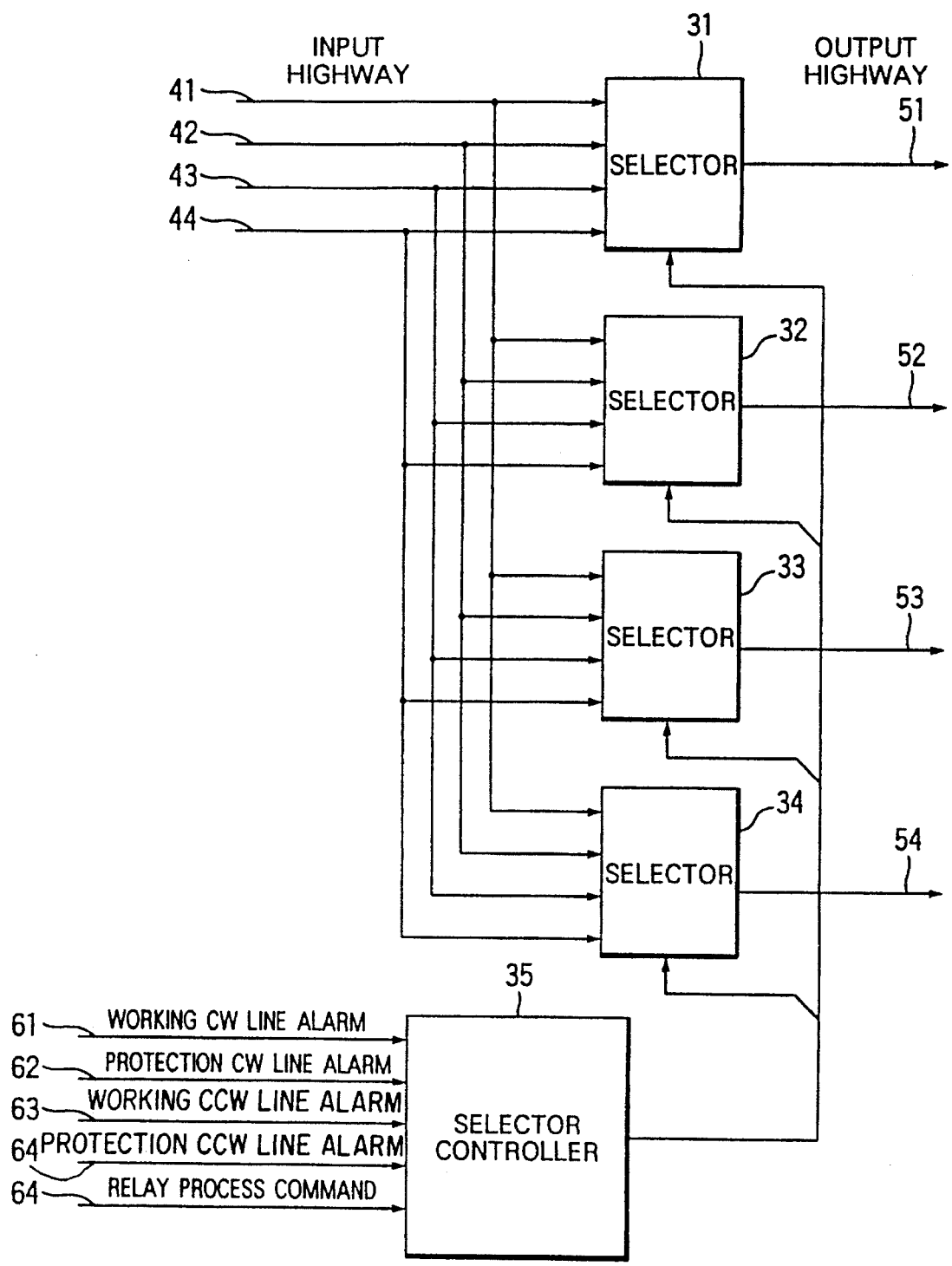
FIG. 8 shows a construction of a space division switch employed in the switch of FIG. 1.

FIG. 8 shows a construction of the first and third stage space division switches 10 and 12. In FIG. 8, each selector is connected to input highways 41-44 and selects one of them. A selector controller 35 controls the selectors by a working CW line alarm 61, a protection CW line alarm 62, a working CCW line alarm 63, a protection CCW line alarm 64 and a relay process command 65. The line alarm means the alarm which is detected at node or the alarm which is informed of by a signal indicated on TA-NWT-001230. When the space division switch in FIG. 8 is used as the first stage space division switch 10, the input highways 41-44 correspond to the CW working line 1, the CW protection line 2, the CCW working line 3 and the CCW protection line 4, respectively. The output highways 51-54 correspond to the highways 15-18, respectively. When the space division switch of FIG. 8 is used as the third stage space switch 12, the input highways 41-44 correspond to the highways 19-22. The output highways 51-54 correspond to the CW working line 5, the CW protection line 6, the CCW working line 7 and the CCW protection line 8, respectively.

Figure 3A:
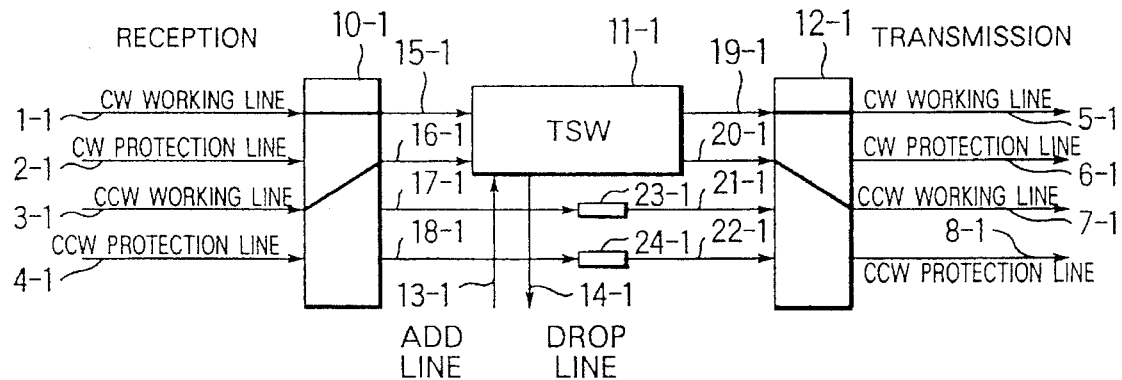
FIGS. 3A, 3B and 3C show processes in a normal state in respective nodes A, B and C.
Figure 3B:
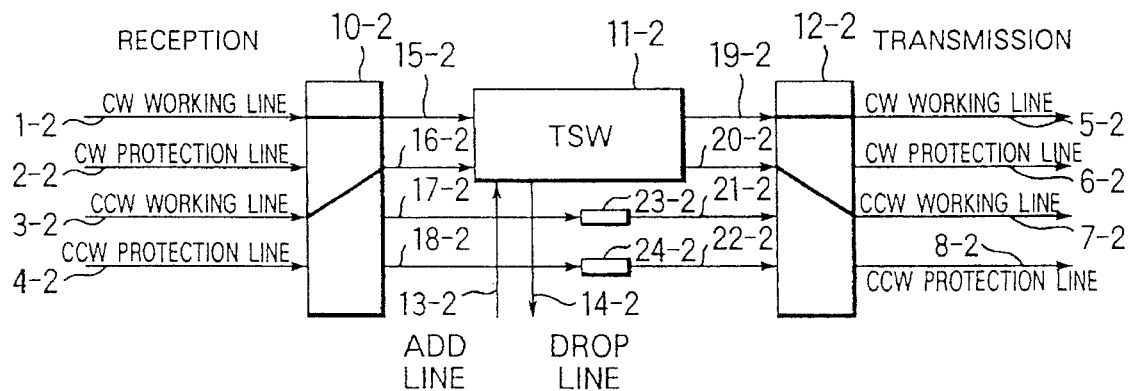
Figure 3C:
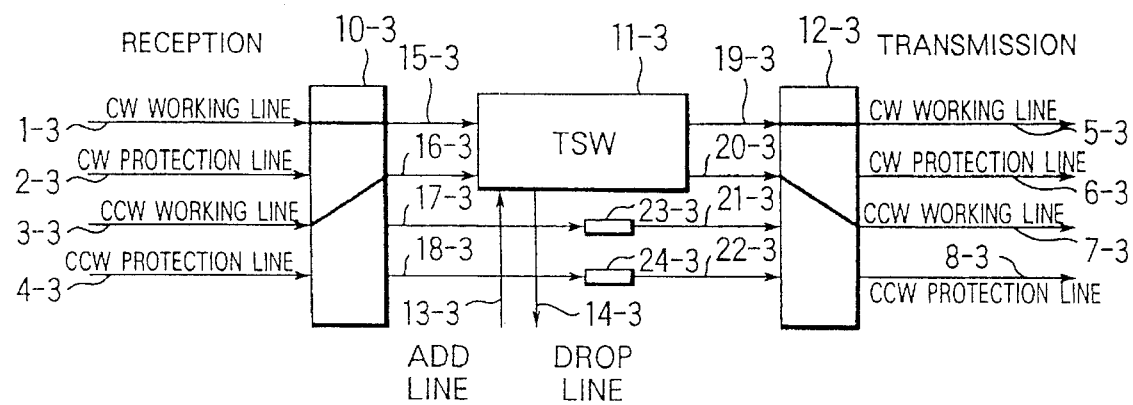

FIGS. 3A–3C show processes of the nodes A-C in the normal state. In the node A, the space division switch 10-1 connects the CW working line 1-1 to the highway 15-1. It also connects the CCW working line 3-1 to the highway 16-1. The relay/add/drop process is conducted in the time division switch 11-1. The space division switch 12-1 connects the output highways 19-1 and 20-1 of the time division switch 11-1 to the CW working line 5-1 and the CCW working line 7-1, respectively. In the nodes B and C, similar processes are conducted.

Figure 4:
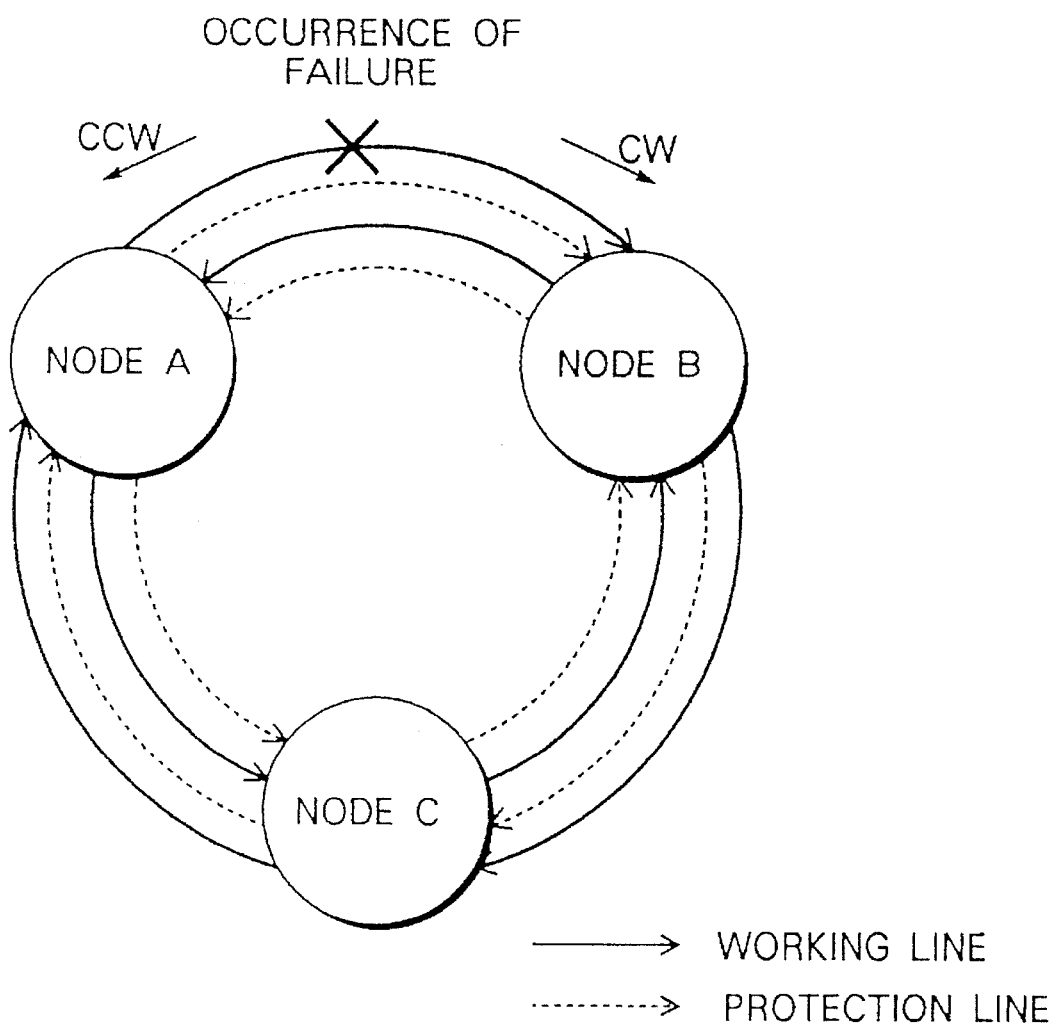
FIG. 4 shows an operation when a failure has occurred in a CW working line between nodes A and B.
Figure 5A:
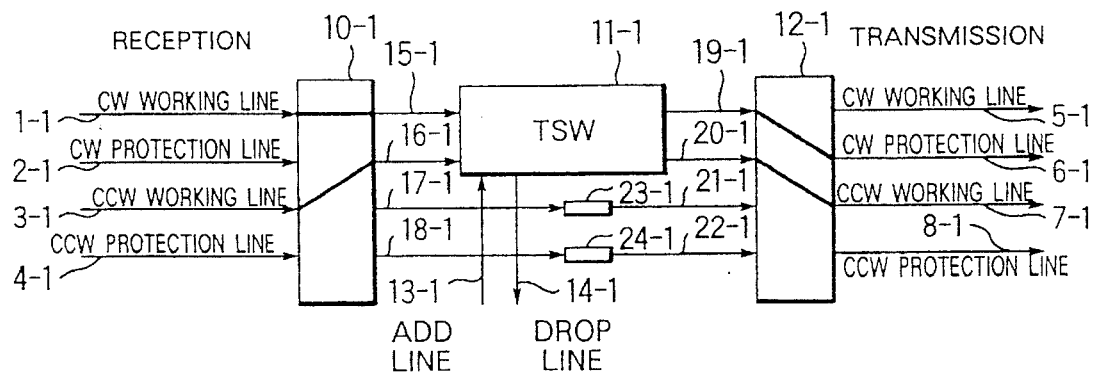
FIGS. 5A, 5B and 5C show processes in the respective nodes A, B and C in the case of FIG. 4.
Figure 5B:
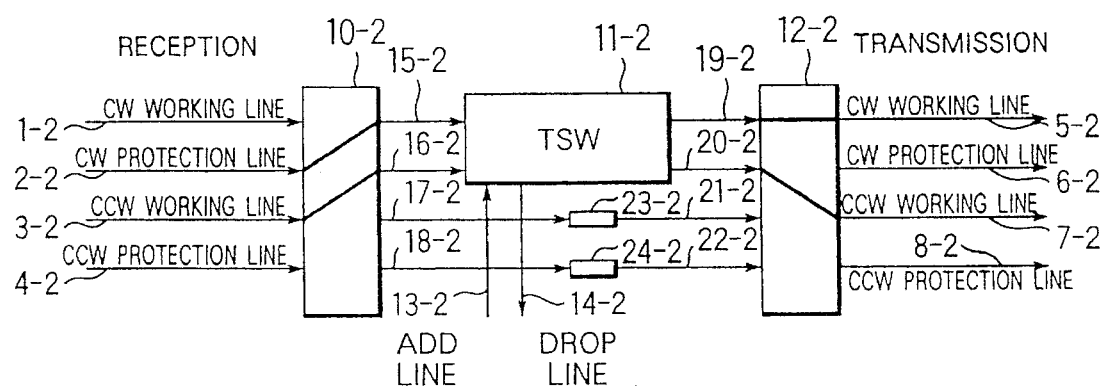
Figure 5C:
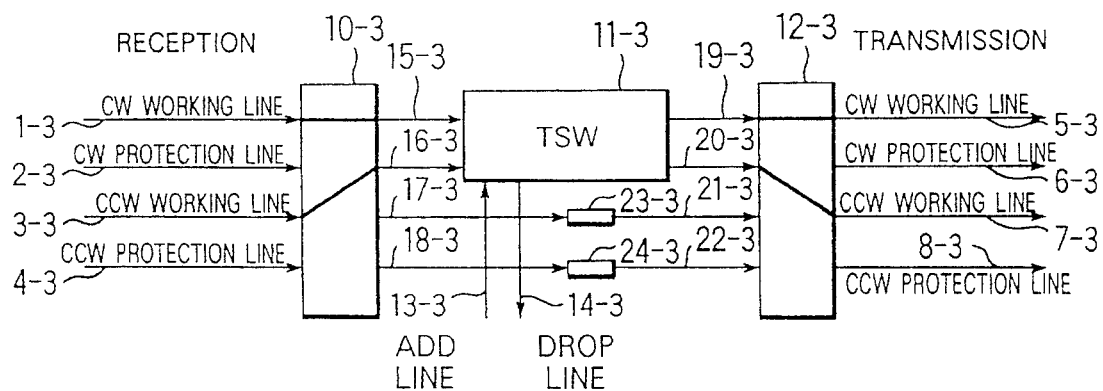

Processes of the nodes when a failure has occurred in the CW working line between the nodes A and B as shown in FIG. 4 is explained. In FIG. 4, since the failure has occurred in the CW working line, it is necessary to use the CW protection line in place of the CW working line. The processes of the nodes in this are shown in FIGS. 5A–5C.

Figure 9:
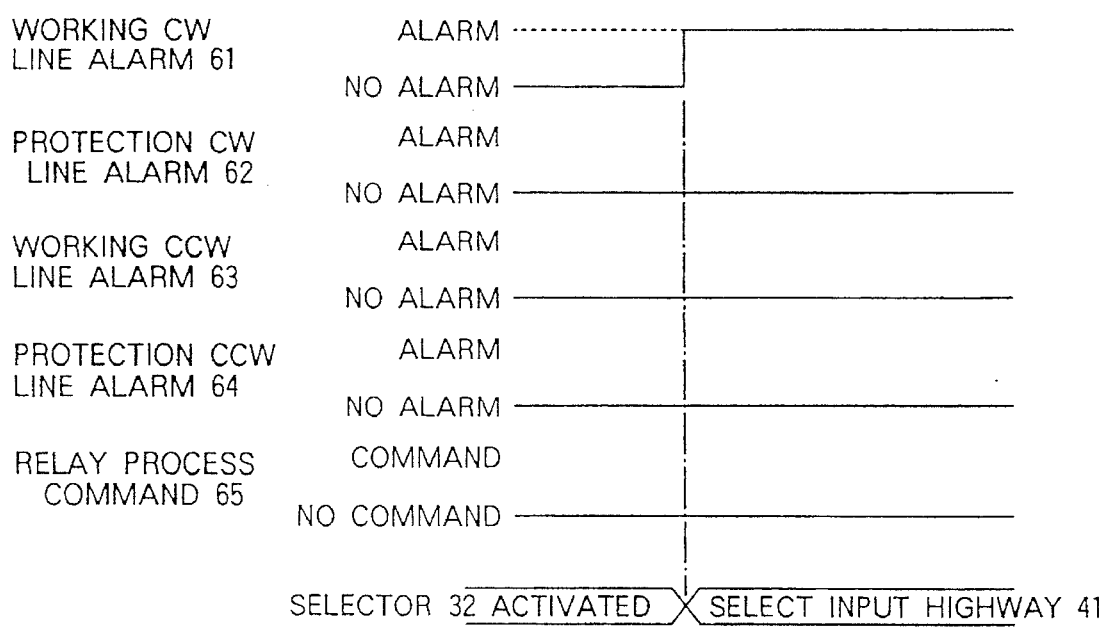
FIG. 9 shows an operation of a space division switch 12-1 in the case of the failure shown in FIG. 4.

In the node A, since the failure has occurred in the transmission CW working line, the output highway 19-1 of the second stage time division switch 11-1 is connected to the CW protection line 6-1 by the third stage space division switch 12-1. Namely, in FIG. 8, the selector controller 35 receives the CW working line alarm 61 and issues a command to the selector 32 to select the input highway 41 and connect it to the output highway 52. An operation thereof is shown in FIG. 9. In this case, there is no change in the process in the first stage space division switch 10-1 and the second stage time division switch 11-1.

Figure 10:
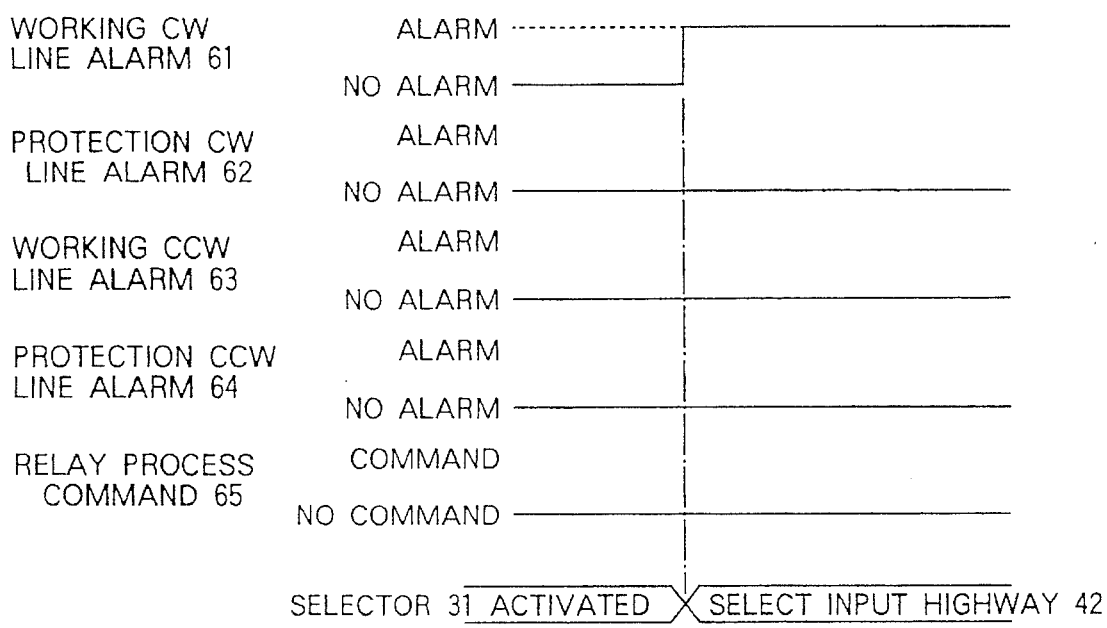
FIG. 10 shows an operation of a space division switch 10-2 in the case of the failure shown in FIG. 4.

In the node B, since the failure has occurred in the reception CW working line, the CW protection line 2-2 is connected to the input highway 15-2 of the second stage time division switch 11-2 by the first stage space division switch 10-2. Namely, in FIG. 8, the selector controller 35 receives the working CW line alarm 61 and issues a command to the selector 31 to select the input highway 42 and connect it to the output highway 51. An operation thereof is shown in FIG. 10. In this case, there is no change in the process in the second stage time division switch 11-2 and the third stage space division switch 12-2.

In the node C, there is no change in the process.

Figure 6:
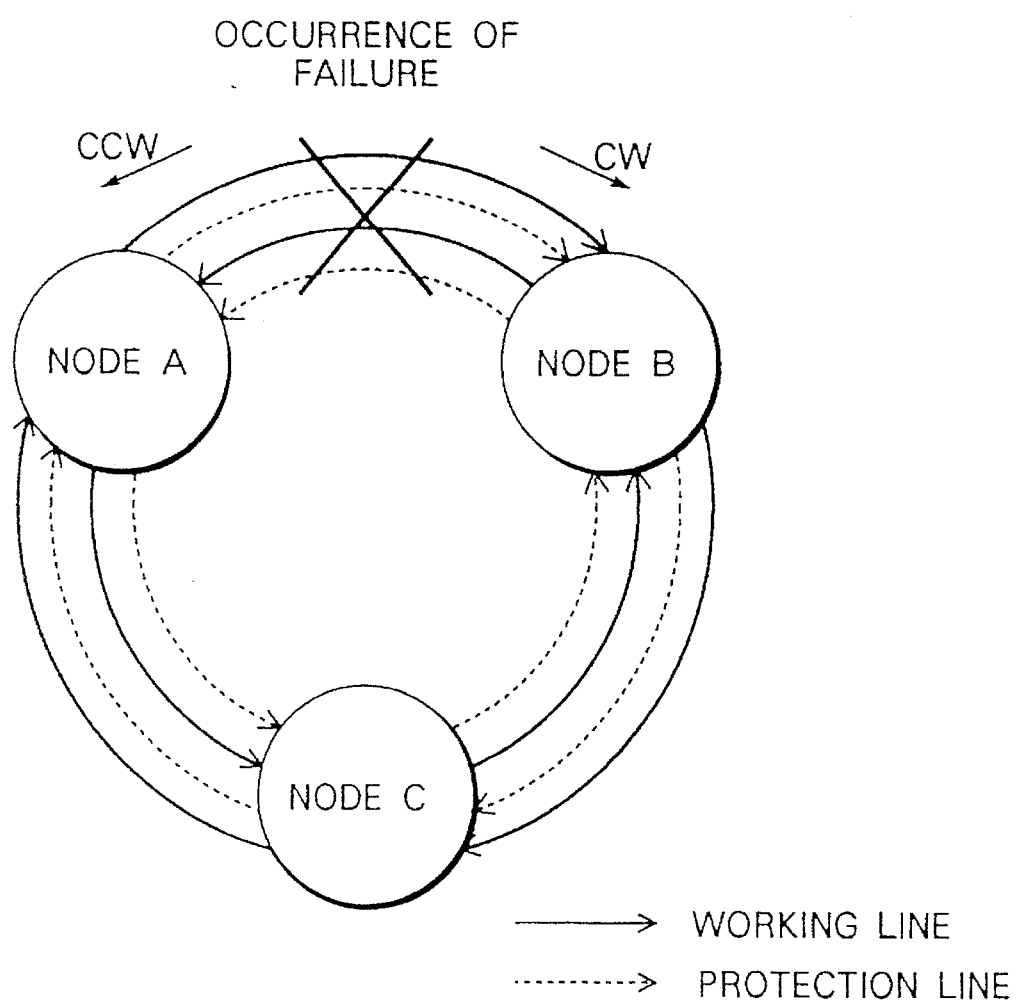
FIG. 6 shows an operation when failures have occurred in all lines between the nodes A and B.
Figure 7A:
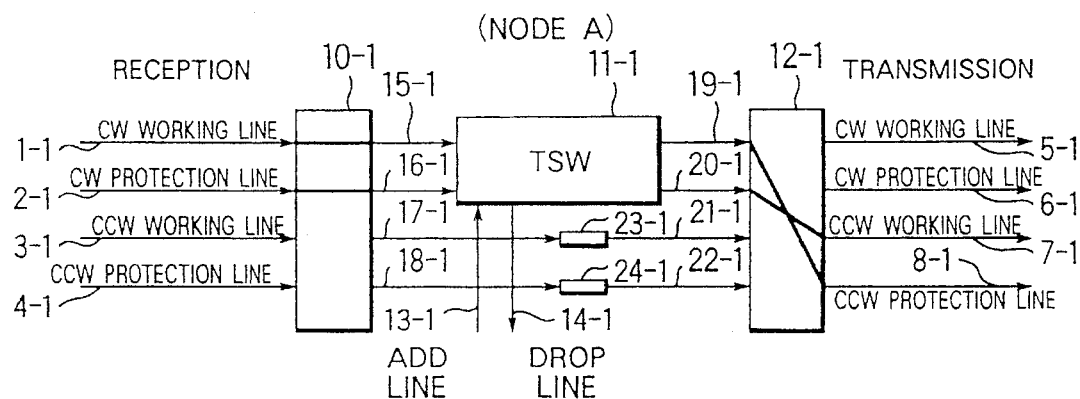
FIGS. 7A, 7B and 7C show processes in the respective nodes A, B and C in the case of FIG. 6.
Figure 7B:
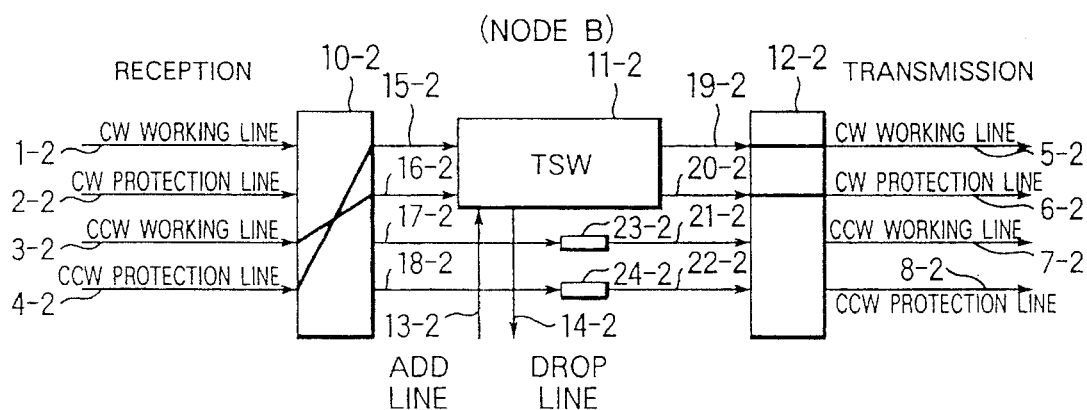
Figure 7C:
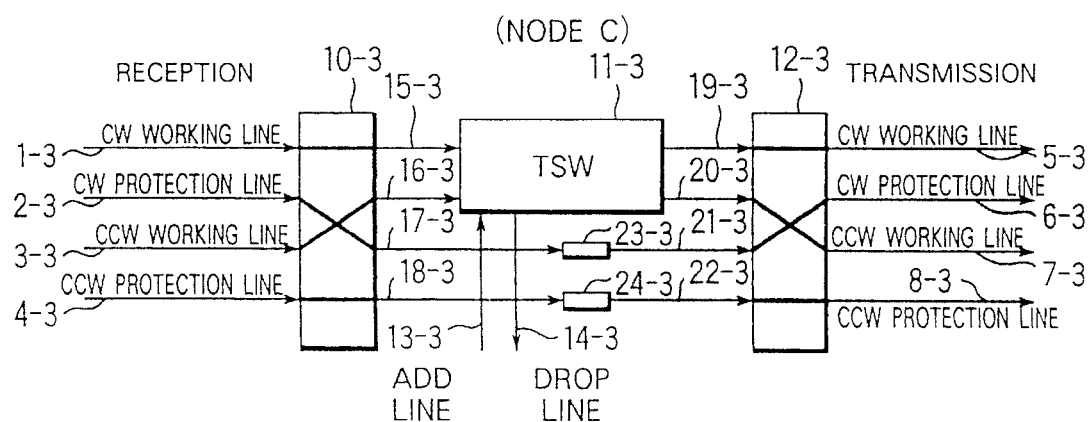

A process when failures have occurred in the CW and CCW working lines and protection lines between the nodes A and B as shown in FIG. 6 is explained. In FIG. 6, since the line is completely broken between the nodes A and B, the node A loops back the signal which it has outputted in the CW direction, by using the CCW protection line, and receives the signal which it has received in the CCW direction, from the CW protection line. The node B loops back the signal which it has outputted in the CCW direction, by using the CW protection line, and received the signal which it has received in the CW direction, from the cCW protection line. In the node C, the reception CW protection line is connected to the transmission CW protection line and the reception CCW protection line is connected to the transmission CCW protection line. The processes in the respective nodes in this case are shown in FIGS. 7A–7C.

Figure 11:
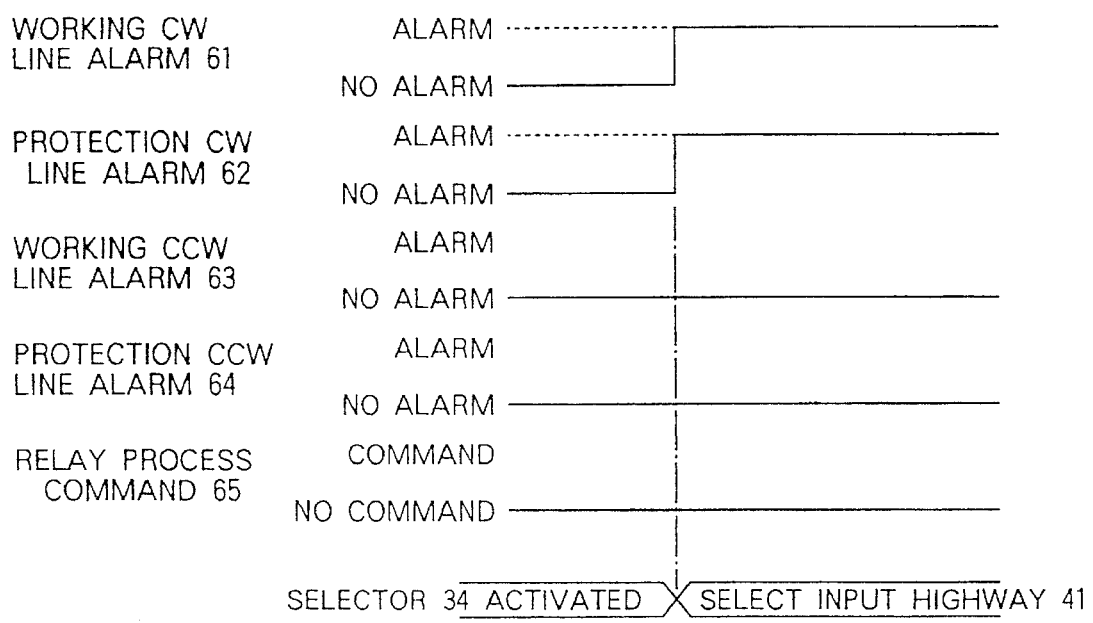
FIG. 11 shows an operation of the space division switch 12-1 in the case the failure shown in of FIG. 6.
Figure 12:
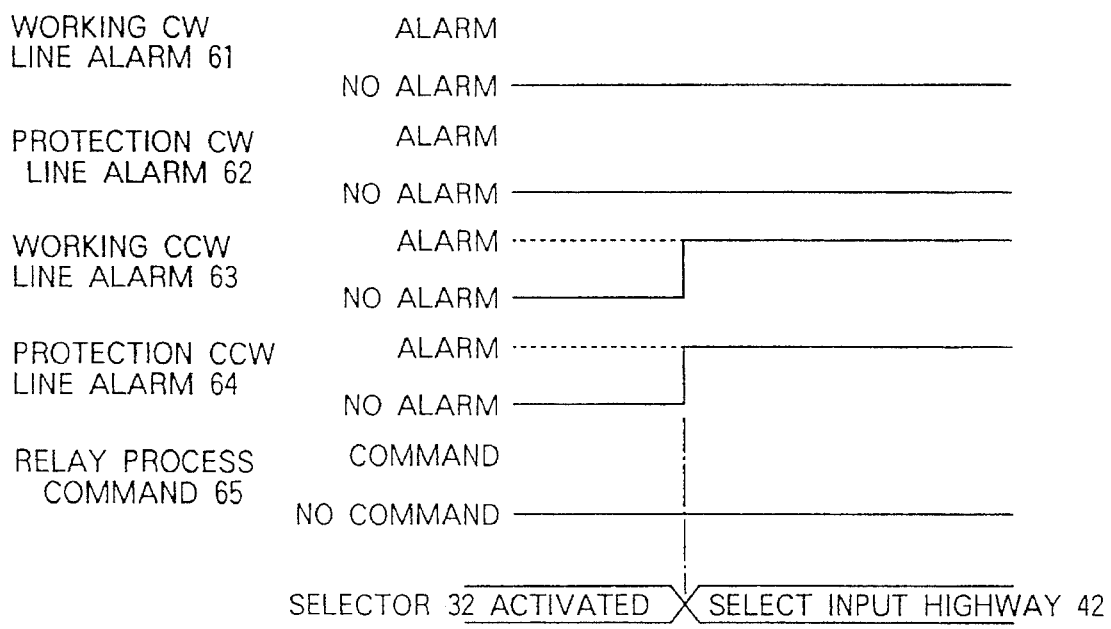
FIG. 12 shows an operation of a space division switch 10-1 in the case of the failure shown in FIG. 6.

In the node A, since the failures have occurred in the transmission CW working line and protection line, the output highway 19-1 of the second stage time division switch 11-1 is connected to the CCW protection line 8-1. Namely, in FIG. 8, the selector controller 35 detects the working CW line alarm 61 and the protection CW line alarm 62 and issues a command to the selector 34 to select the input highway 41 and connect it to the output highway 54. An operation thereof is shown in FIG. 11. Since the failures have occurred in the receiving CCW working line and protection line, the CW protection line 2-1 is connected to the highway 16-1 by the first stage space division switch 10-1. Namely, in FIG. 8, the selector controller 35 detects the CCW working line alarm 63 and the CCW protection line alarm 64 and issues a command to the selector 32 to select the input highway 42 and connect it to the output highway 52. An operation thereof is shown in FIG. 12. In this case, there is no change in the process in the second stage time division switch 11-1.

Figure 13:
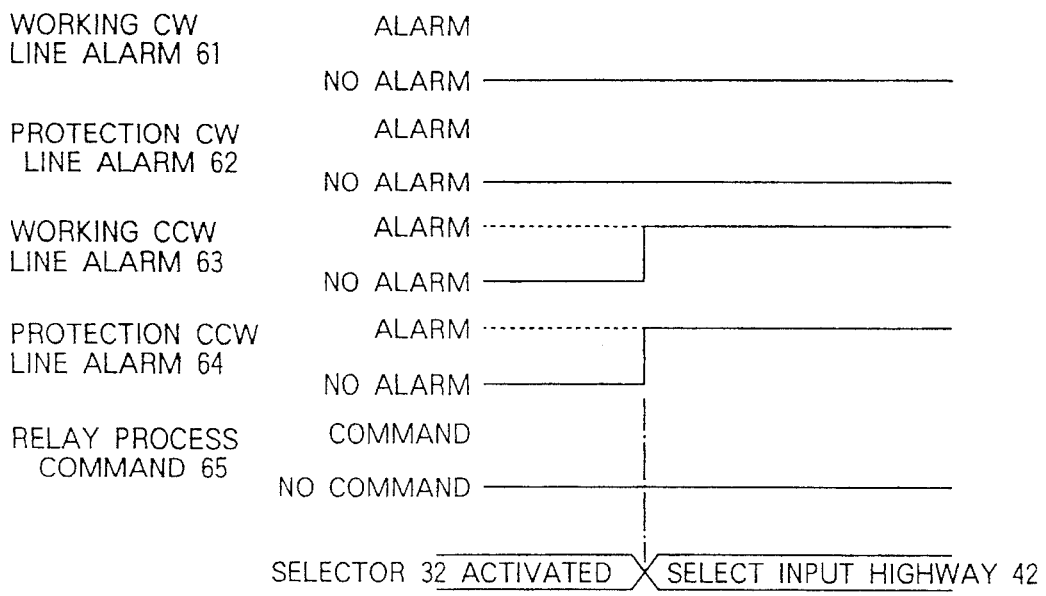
FIG. 13 shows an operation of a space division switch 12-2 in the case of the failure shown in FIG. 6.
Figure 14:
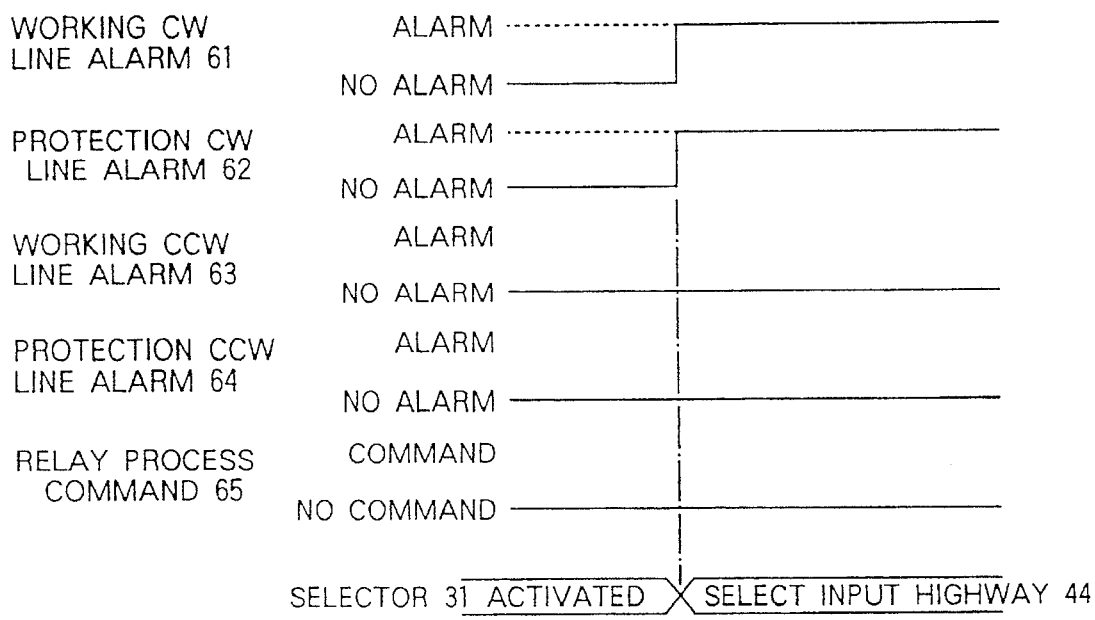
FIG. 14 shows an operation of the space division switch 10-2 in the case of the failure shown in FIG. 6.

In the node B, since the failures have occurred in the transmission CCW working line and protection line, the output highway 20-2 of the second stage time division switch 11-2 is connected to the CW protection line 6-2 by the third stage space division switch 12-2. Namely, in FIG. 8, the selector controller 35 detects the CCW working line alarm 63 and the CCW protection line alarm 64 and issues a command to the selector 32 to select the input highway 42 and connect it to the output highway 52. An operation thereof is shown in FIG. 13. Further, since the failures have occurred in the reception CW working line and protection line, the CCW protection line 4-2 is connected to the highway 15-2 by the first stage space division switch 10-2. Namely, in FIG. 8, the selector controller 35 detects the CW working line alarm 61 and the CW protection line alarm 62 and issues a command to the selector 31 to select the input highway 44 and connect it to the output highway 51. An operation thereof is shown in FIG. 14. In this case, there is no change in the process in the second stage time division switch 11-2.

Figure 15:
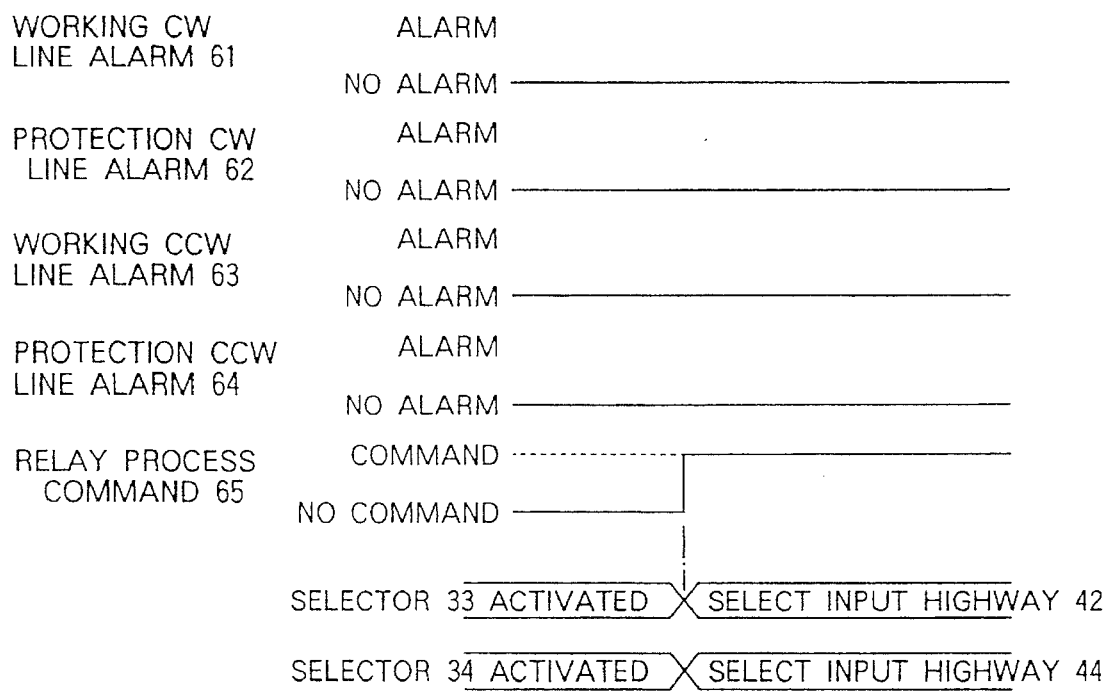
FIG. 15 shows an operation of a space division switch 10-3 in the case of the failure shown in FIG. 6.
Figure 16:
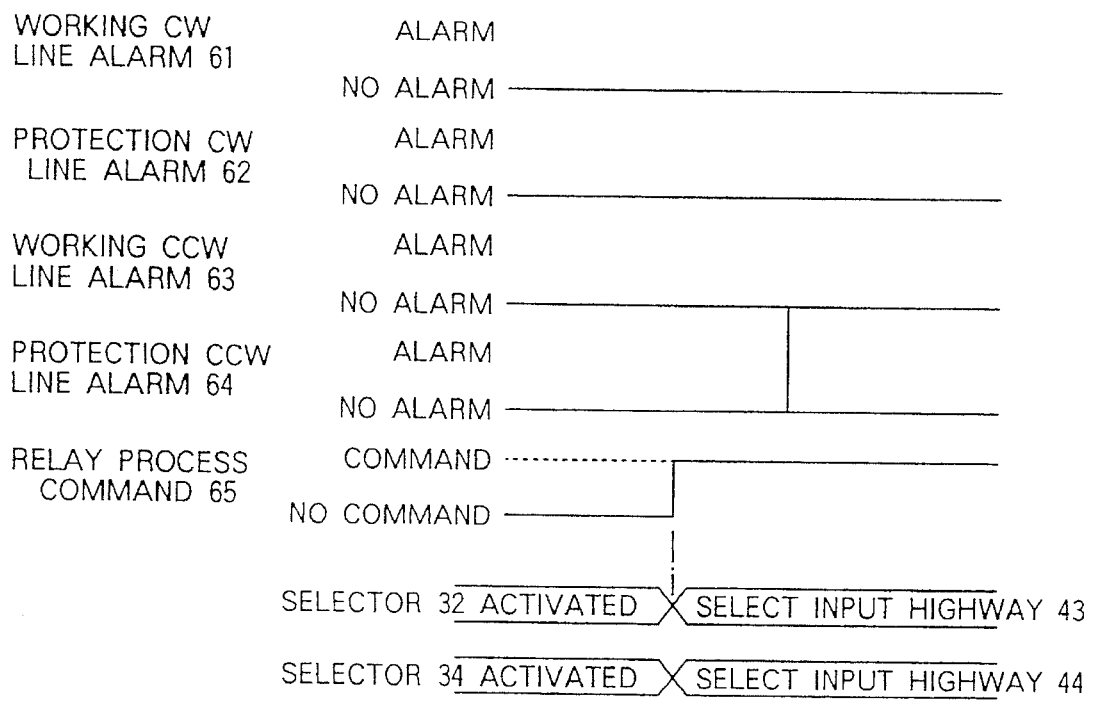
FIG. 16 shows an operation of a space division switch 12-3 in the case of the failure shown in FIG. 6.

The node C connects the the reception CW protection line 2-3 to the transmission CW protection line 6-3 and connects the reception CCW protection line 4-3 to the transmission CCW protection line 7-3 by using the two highways 17-3 and 18-3 for connecting the first stage and third stage space division switches. An operation of the space division switch 10-3 in this case is explained with reference to FIG. 8. Namely, in FIG. 8, the selector controller 35 issues a command to the selector 33 in response to a relay process command 65 to select the input highway 42 and connect it to the output highway 53. It also issues a command to the selector 34 to select the input highway 44 and connect it to the output highway 54. An operation thereof is shown in FIG. 15. A process of the space division switch 12-3 is now explained with reference to FIG. 8. Namely, in FIG. 8, the selector controller 35 issues a command to the selector 32 in response to the relay process command 65 to select the input highway 43 and connect it to the output highway 52. It further issues a command to the selector 34 to select the input highway 44 and connect it to the output highway 54. An operation thereof is shown in FIG. 16. In this case, there is no change in the process in the second stage time division switch 11-3. The same delay as the signal delay created in the time division switch 11-3 is created in the signals on the highways 17-3 and 18-3 by the delay inserters 23-3 and 23-4. The signal delay means a difference between the frame phase of the signal inputted from the highway 15-3 and the frame phase of the signal outputted from the highway 19-3.

In this manner, the failure recovery process is conducted. In accordance with the present invention, the scale of the time division switch for the self-healing ring can be reduced.

Next, it is explained concerning the case in which the present invention is applied to 2 fiber BLSR. In this case, the space division switches are set as shown in FIGS. 3A, 3B and 3C. The protection line is placed in a state in which the protection line is not used. As a common countermeasure for the failure in the method for controlling the time division switch TSW, a reroute memory system has been known. In this system, a plurality of control memories are provided in the time division switch and different line setting information is stored in the respective control memories. The line setting information of the respective control memories correspond to the patterns of occurrence of the line failure. Namely, one control memory which gives an optimum detour is selected by the pattern of occurrence of the line failure to conduct the line setting. This method is disclosed in JP-A-4-57528 "Synchronous Multiples Terminal Device".

In this method, it is necessary to provide the same number of control memories as the number of combination of the line failure patterns and the number of control memories is very large. For example, where this method is adopted in conducting the path setting in the paths A and B, four or more control memories are needed. Namely, the line setting information for the normal path A and the normal path B are stored in the first control memory, the line setting information when a failure is detected in only the path A is stored in the second control memory, the line setting information when a failure is detected in only the path B is stored in the third control memory, and the line setting information when failures are detected in both the path A and the path B are stored in the fourth control memory. While two paths are set in the above example, the number of control memories increases by combination when the number of paths increases.

In the present invention, n control memories are provided in the switch. Connection information in the normal state of each path set in the transmission line is stored in the first control memory. Connection information of a first alternative path when a failure occurs in the path, is stored in the second control memory. Connection information of a second alternative path when a failure occurs in the first alternative path is stored in the third control memory. For the n-th control memory (that is any control memory higher than the third control memory), connection information of the (n-1)th alternative path when a failure occurs in the (n-2)th alternative path of the path, is stored in the n-th control memory. The control memory which corresponds to the failure pattern for each path is selected from the n control memories by the space division switch.

By switching the control memory for each channel by the methods above mentioned, the alternative path may be selected for each channel and hence the number of control memories may be no greater than the number of alternative paths.

Figure 17:
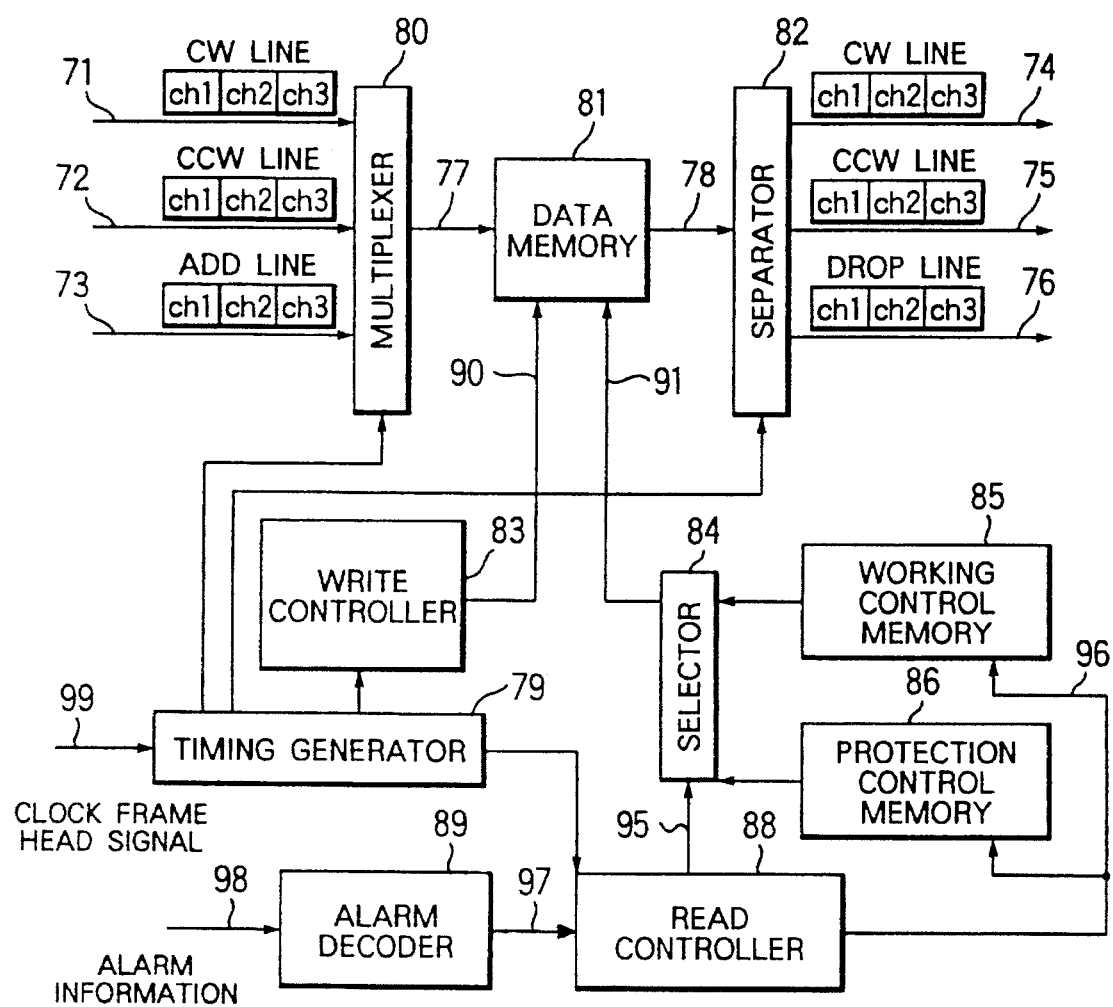
FIG. 17 shows a basic construction of a switch according to a second embodiment of the present invention.
Figure 18:
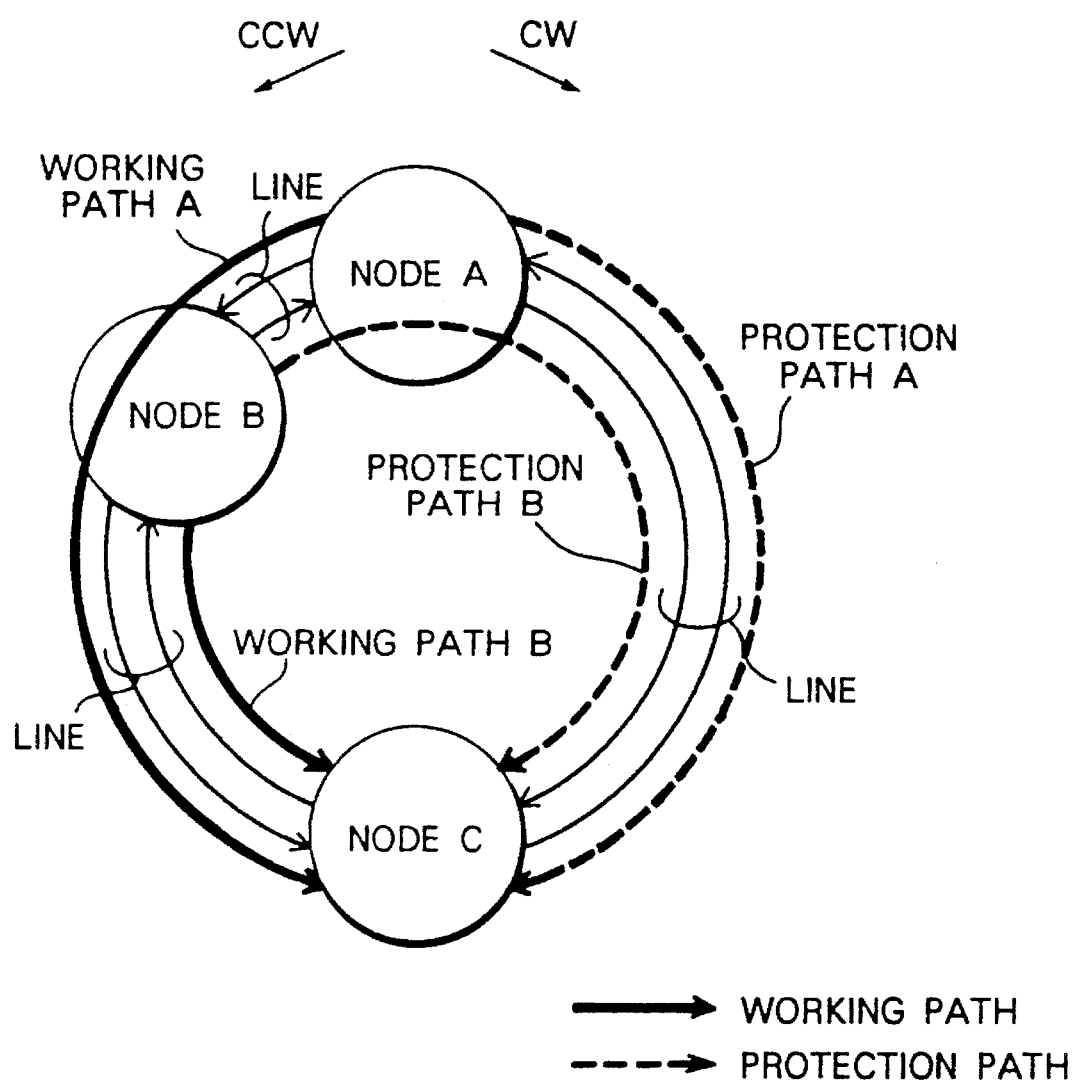
FIG. 18 shows a construction of a ring network employing the switch of FIG. 17.

An embodiment thereof is explained with reference to FIG. 18. In FIG. 18, three nodes A-C are connected in ring by the line. Paths are set through the line in both the CW (clockwise) direction and the CCW (counter-clockwise) direction and one is a working line and, the other is the protection line. In FIG. 17, a working path A is set between the node A and the node B, and a protection path B is set between the node B and the node C. In the node C, the working path A is previously selected. When a failure is detected in the working path A, the protection path B is selected. In the node C, this operation is instantly carried out by the switching of the control memory.

The switch used in the node C is shown in FIG. 17. The switch shown in FIG. 17 is a time division switch (TSW) and accommodates a CW line 71, a CCW line 72 in an input highway and an add line 73 for adding data in the corresponding node. The data on the lines 71-73 are multiplexed by a multiplexor 80 and it is supplied to a data memory 81 through a highway 77. The data from the data memory 81 are applied to a drop line 76 for dropping the data in the corresponding node into the CW line 74 and the CCW line 75, through the highway 78 and a demultiplexer or separator 82. Each line transmits three channels in a time division multiplex system. A write controller 83 receives a clock and frame head signal 99 through a timing generator 79 and generates an address for writing the signal on the highway 77 into the data memory 81.

Figure 19:
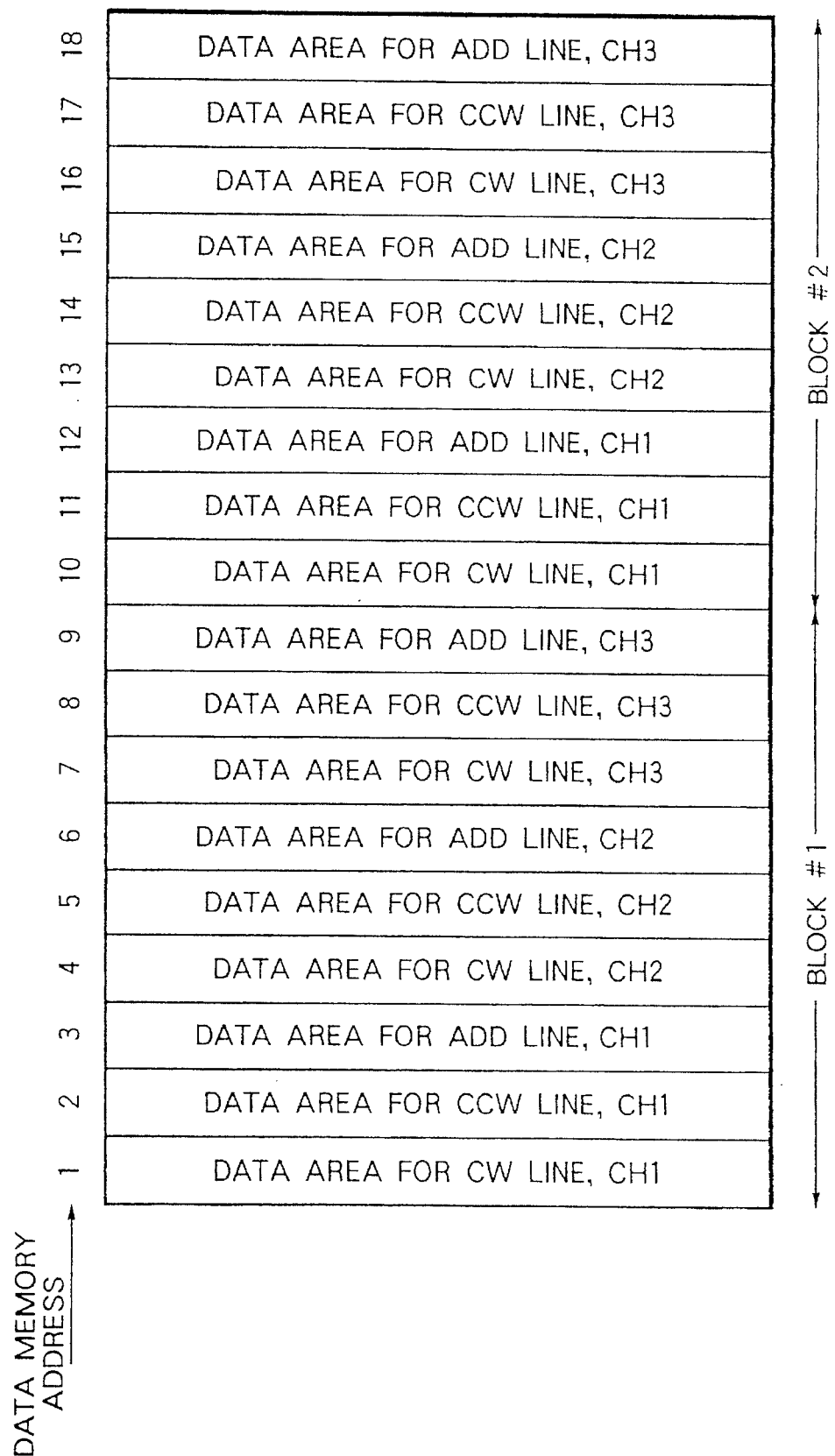
FIG. 19 shows a mapping of a data memory 81 of FIG. 17.

FIG. 19 shows a memory map of the data memory 81. As shown in FIG. 19, the data memory comprises two blocks #1 and #2. For example, ch1 of the reception CW line 71 is stored at address 1 or 10, and ch1 of the CCW line 72 is stored at address 2 or 11, where ch represents a channel.

It is assumed that the working path A is allocated to the ch1 of the CCW line 72 of FIG. 17 and the protection path A is allocated to the ch1 of the CW line 71. It is also assumed that the working path B is allocated to the ch2 of the CCW line 72 and the protection path B is allocated to the ch2 of the CW line 71.

The switch of FIG. 17 has the working control memory 85 and the protection control memory 86. Each control memory holds the address information of the data memory 81 and the content of the control memory is supplied to the data memory 81 as the read address 91 to output the required data to the transmission line. A plurality of protection memories may be provided.

Figure 20:
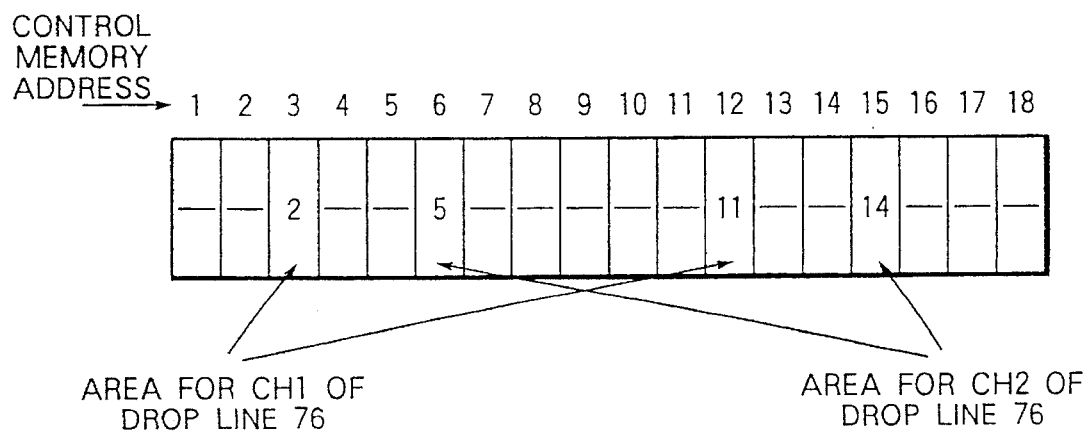
FIG. 20 shows a mapping of a working control memory 85 of FIG. 17.
Figure 21:
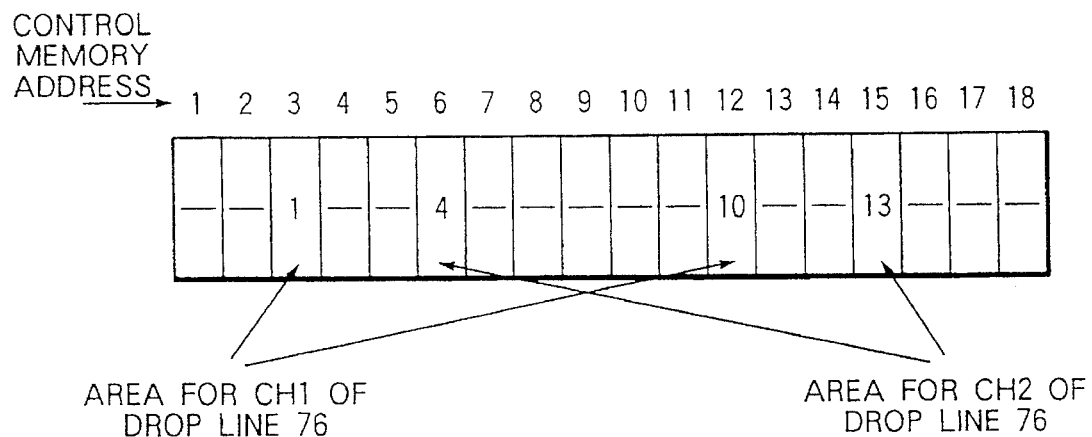
FIG. 21 shows a mapping of a protection control memory 86 of FIG. 17.

Mappings in the working control memory 85 and the protection control memory 86 are shown in FIGS. 20 and 21, respectively. In the node C, in order to output the path A and the path B to the drop line 76, the data from the working path A in the ch1 of line 72 (ch1 of the CCW line) is read and the data from the working path B in the ch2 of line 72 is (ch2 in the CCW line) read. Namely, values 2 and 11 are held in the area for the ch1 of the drop line 76 of the working control memory 85, and values 5 and 14 are held in the area for the ch2. These values are addresses of the ch1 and ch2 of the CCW line (on which the working paths are set) in the data memory 81. Values 1 and 10 are held in the area for the ch1 of the drop line 76 of the protection control memory 86, and values 4 and 13 are held in the area for the ch2. They are the area for the ch1 and ch2 of the CW line (on which the protection path is set) in the data memory 81. It is assumed that the addresses to which the area for the drop line 76 is allocated are equal in the working control memory 85 and the protection control memory 86.

Figure 22:
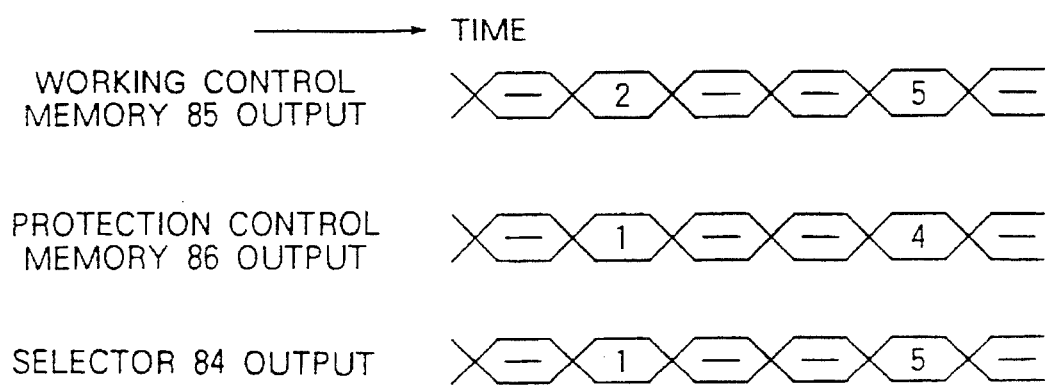
FIG. 22 shows an operation of a selector 84 when a failure has occurred in a working path.

In FIG. 18, the process when a failure occurs in only the working path A is explained. The node C detects the failure by an alarm decoder 89 based on the alarm information 98 and transmits it to a read controller 88 as shown in FIG. 17. When data is to be read from the data memory 81 to the ch1 of the drop line 76 the selector 84, selects the protection control memory 86 and reads the data from the address 1 or 10 of the data memory 81. When the data is to be read from the data memory 81 to the ch2 of the drop line 76, it selects the working control memory 85 and reads the data from the address 5 or 14 of the data memory 81. An operation of the selector 84 is shown in FIG. 22.

Figure 23:
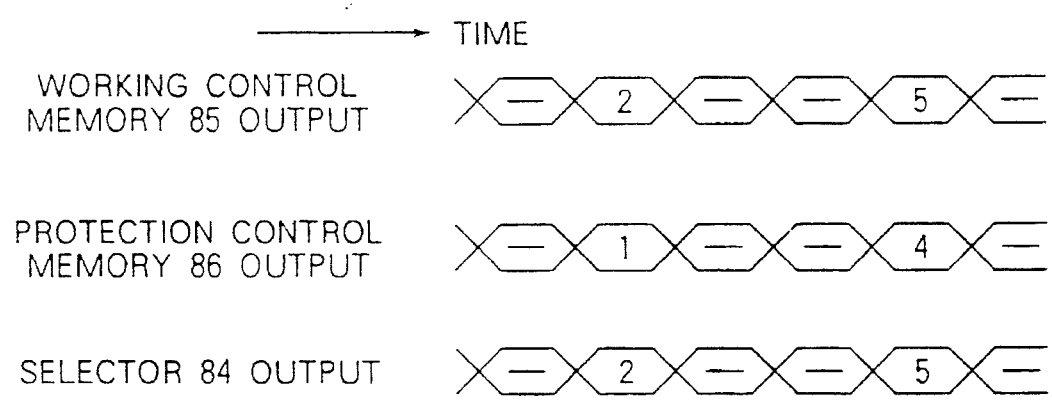
FIG. 23 shows an operation of the selector in a normal state.

In the normal state (no failure is detected in the path A and the path B), the selector 84 always selects the working control memory 85. When the data is to be read from the data memory 81 to the ch1 of the drop line 76, the working control memory 85 is selected and the data is read from the address 2 or 11 of the data memory 81. When the data is to be read from the data memory 81 to the ch2 of the drop line 76, the working control memory 85 is selected and the data is read from the address 5 or 14 of the data memory 81. An operation of the selector 14 is this case is shown in FIG. 23.

In the present embodiment, the working path is set in the CCW line and the protection path is set in the CW line, although the setting may be reverse.

Alternatively, the connection information of the channel may be stored in the control memory and the control memory may be shared by a plurality of lines so that the need to increase the number of control memories in the switching of the line can be avoided.

What is claimed is:

1. A switch for a self-healing ring comprising:

a first space division switch;

an add-drop switch; and a second space division switch, wherein each of said first and second space division switches having a scale of at least four inputs and four outputs;

two lines of outputs of said add-drop switches being connected to the inputs of said second space division switch; and two lines other than the two lines connected to said add-drop switch, of the outputs of said first space division switch being connected to said second space division switch.

2. A switch for a self-healing ring according to claim 1 wherein a delay inserter for applying the same delay as that created in said add-drop switch is provided in each of said two lines connected to said second space division switch, of the outputs of said first space division switch.

3. A switch for a self-healing ring according to claim 2 wherein said delay inserter is a RAM.

4. A switch for a self-healing ring comprising:

a switch having a first stage space division switch, a second stage add-drop switch and a third stage space division switch, each being used for a plurality of nodes;

clockwise working line and protection line and counterclockwise working line and protection line for reception being connected to inputs of said first stage space division switch; and four outputs of said third stage space division switch being connected to clockwise working line and protection line and counterclockwise working line and protection line for transmission.

5. A switch for a self-healing ring according to claim 4 wherein said first stage space division switch normally connects said clockwise working line and said counterclockwise working line of said clockwise working line and protection line and said counterclockwise working line and protection line connected to the inputs to said second stage add-drop switch, and when a failure occurs in said clockwise working line, connects said clockwise protection line and said counterclockwise working line to said second stage add-drop switch, and when a failure occurs in said counterclockwise working line, connects said clockwise working line and said counterclockwise protection line to said second stage add-drop switch, and when failures occur in both said counterclockwise working line and protection line, connects said clockwise working line and protection line to said second stage of add-drop switch.

6. A switch for a self-healing ring according to claim 4 wherein two lines of the outputs of said second stage add-drop switch connected to the inputs of said third stage space division switch are normally connected to said clockwise working line and said counterclockwise working line for transmission, and when a failure occurs in said clockwise working line for transmission, said two lines are connected to said clockwise protection line and said counterclockwise working line for transmission, and when failures occur in both said clockwise working line and protection line for transmission, said two lines are connected to said counterclockwise protection line and working line for transmission, and when a failure occurs in said counterclockwise working line for transmission, said two lines are connected to said clockwise working line and said counterclockwise protection line for transmission, and when failures occur in both said counterclockwise working line and protection line for transmission, said two lines are connected to said clockwise working line and protection line for transmission.

7. A method of controlling a time divisional switch including a data memory for storing channel data input from a plurality of input lines and a plurality of control memories for storing control information which is used for controlling an output of data from said data memory, said channel data being time multiplexed in time slots, comprising the steps of:

simultaneously accessing the plurality of said control memories;

selecting an output from one of said control memories for each time slot and setting the control information obtained from the selected output as a read address for said data memory; and outputting channel data corresponding to said read address from said memory during the time slot.

8. A time divisional switch for a self-correcting ring including a plurality of transmission lines comprising:

a plurality of input lines;

a data memory storing channel data received by the plurality of input lines, said channel data being multiplexed in a plurality of time slots;

a plurality of control memories storing control information;

a read controller simultaneously accessing said plurality of control memories;

a selector providing an output from one of said control memories for each time slot, the control information obtained from the provided output constituting a read address for said data memory; and means for outputting a channel data corresponding to said read address from said data memory at a predetermined time slot.

9. The time divisional switch of claim 8, wherein said plurality of control memories include, a first control memory storing control information that can be used when there are no defects in any one of the plurality of transmission lines, each of the plurality of transmission lines being allotted to a predetermined time slot for receiving channel data from said means for outputting.

10. The time divisional switch of claim 9, wherein said plurality of control memories further include a second control memory to control a read out of data from said data memory when a plurality of transmission lines are used to transmit common data.

* * * * *

UNITED STATES PATENT AND TRADEMARK OFFICE
CERTIFICATE OF CORRECTION

PATENT NO. : 5,475,676
DATED : December 12, 1995
INVENTOR(S) : Masahiro Takatori, et. al.

It is certified that error appears in the above-indentified patent and that said Letters Patent is hereby corrected as shown below:

Column 5, line 63 change "cCW" to --CCW--.

Signed and Sealed this

Fourth Day of June, 1996

Attest:

BRUCE LEHMAN

Attesting Officer  Commissioner of Patents and Trademarks